UNITED STATES PATENT OFFICE.

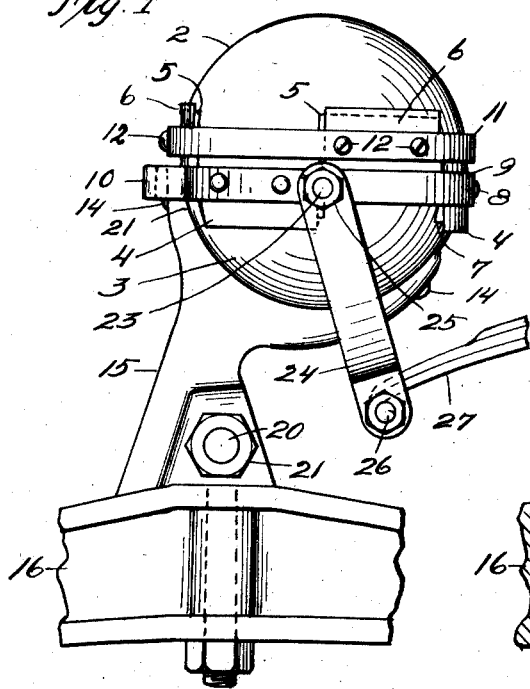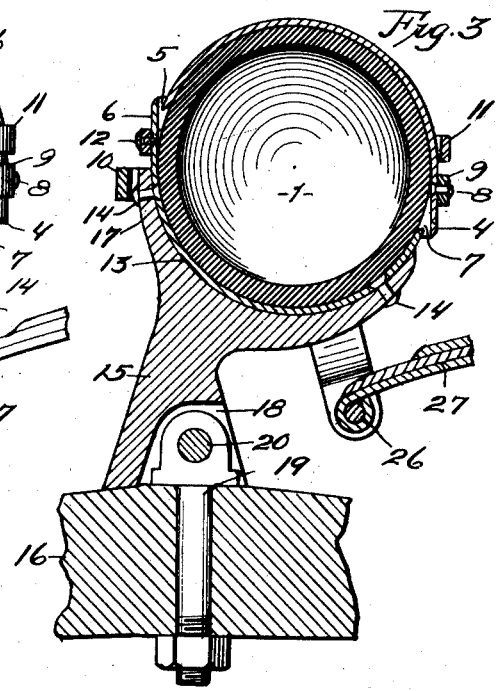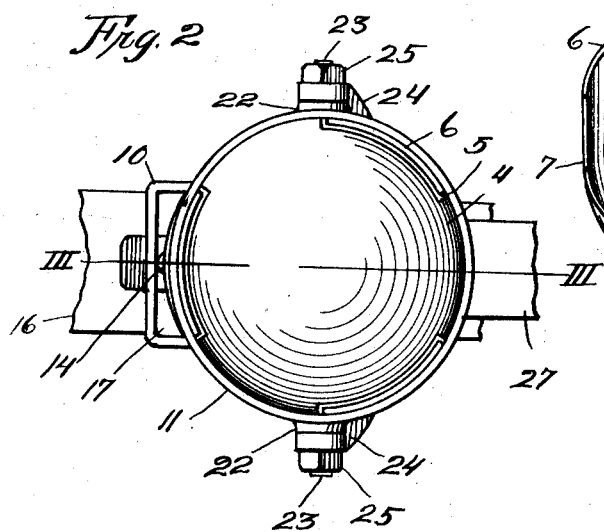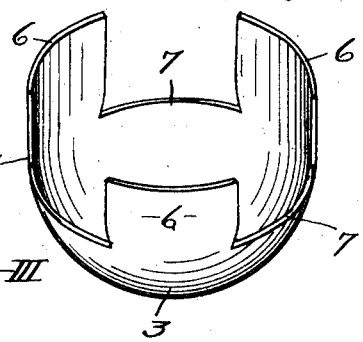

GEORGE S. MATTHEWS, OF KANSAS CITY, MISSOURI, ASSIGNOR OF ONE-HALF TO AUGUSTINE DOEHLER, OF KANSAS CITY, MISSOURI.

SUSPENSION AIR-CUSHION.

1,401,420.   Specification of Letters Patent.   Patented Dec. 27, 1921.

Application filed September 20, 1920. Serial No. 411,570.

*To all whom it may concern:*

Be it known that I, GEORGE S. MATTHEWS, citizen of the United States, and resident of Kansas City, county of Jackson, State of Missouri, have invented a certain new and useful Improvement in Suspension Air-Cushions, of which the following is a complete specification.

This invention relates to suspension devices for vehicles, and more especially to shock absorbing suspension devices for motor cars. It relates more especially to that general class of suspension device on which I secured patent February 1st, 1916, No. 1170084, which employs a series of resilient spherical devices interposed between the body of the vehicle and the running gear, and the object of the present invention as distinguished from that above identified, is to produce a simpler construction and one in which the necessity for extreme care in construction and in the application of the device to operative position is avoided, it having been found that the device of said patent while efficient in operation, was difficult to make and also required the exercise of considerable skill in assembling it properly.

With the objects mentioned in view, the invention consists in certain novel and useful features of construction and combinations of parts as hereinafter described and claimed; and in order that it may be fully understood, reference is to be had to the accompanying drawing, in which:—

Figure 1 is a front view of a fragment of the axle of a motor car, and one of these suspension devices interposed between the axle and a portion of one of the springs of the car.

Fig. 2 is a top plan view of the construction shown by Fig. 1.

Fig. 3 is a central vertical section taken on the line III—III of Fig. 2.

Fig. 4 is a detail perspective view of one of the housing members of the resilient cushion of the device.

Before proceeding with the detailed description of the invention, it is desired to state that the device may be used as a cushion directly between the running gear and the body of a vehicle as well as between the spring and running gear—in fact, may be employed in any suitable connection or position where it is desirable or necessary to cushion road shocks.

Referring now to the drawing in detail, 1 indicates one of a series of resilient spherical cushioning devices such as hollow rubber balls, and 2 and 3 indicate hollow hemispherical housing members for the spherical cushion, these members being arranged with their hollow sides opposed and conjointly presenting to view a spherical housing. The said members are preferably made of sheet steel or the like and are of identical form and construction except that they are inverted with respect to each other when in operative relation, the member 2 receiving the upper half of the ball and the member 3 the lower half thereof. Each of said members is provided with alternately arranged tongues and recesses, those of the member 2 being respectively indicated by the reference characters 4 and 5, and those of member 3 by the reference characters 6 and 7. The arrangement of the members is such that the tongues of each project into the recesses of the other to planes beyond the center of the spherical cushion, and it will be noted by reference particularly to Fig. 3, that the portions of the tongues projecting beyond the center of the cushion, are vertical so that the members can approach each other without conflict between the ends of the tongues and the bottoms of the recesses.

Riveted as at 8 or otherwise to the tongues of member 2 below the horizontal plane of the center of the cushion, is a ring 9, provided at one side with a loop 10, for a purpose which hereinafter appears, and a substantially similar ring 11 is riveted as at 12 or otherwise secured to the tongues 6 of the lower member, but in a plane above the center of the resilient cushion, so that the rings shall be spaced apart. It will be apparent from the foregoing that the rings 9 and 11 are used to prevent undue separating movement of the members 2 and 3, and the compression of the resilient member is not interfered with by said rings, as under such action, there is relative separating movements between the rings.

The lower member is seated in a pocket 13 conforming to the curvature of said member and is riveted in said pocket as at 14, the pockets being formed at the upper end of a bracket 15 fitting upon the axle 16 of the car, it being noted that twisting movements of member 3 in the pockets 13 are prevented not only by the rivets 14, but by the arm 17 projecting upward from the bracket into the loop 10 of ring 9, as shown most clearly by Figs. 2 and 3.

The bracket 15, of course, may be of any suitable form for proper attachment to the axle or any other proper support, but in the drawing, it is shown as adapted for use upon the front axle of a Ford car, and is provided with a recess 18 for receiving the perforated head of the bolts 19 fastened to the axle. The customary radius rod 20 is extended through the eye of the head of bolt 19 or a bolt may be employed where the employment of the radius rod is not available for the purpose. In either case the connection is made secure by the use of a nut 21.

At diametrically opposite points the ring 9 is formed with bosses 22 from which project threaded studs 23, pivotally engaged by swinging links 24 of arcuate or curved form, nuts 25 engaging said threaded studs and retaining said links in position. The lower ends of the links are equipped with a pivot bolt 26 by which is fastened to the links the adjacent end of one of the springs 27 of the car. It will thus be seen that the body of the car (not shown) mounted upon said spring, is pivotally suspended by said links from the ring 9 of the upper member of the cushion, and that the latter is therefore interposed between the body of the car and the axle 16, so that said cushion shall absorb the road shock in an obvious manner, the rings 9 and 11 checking excessive rebounding action, as will be readily understood.

Relative to the up and down movement, it will be apparent that the upper member through its loop 10 fitting on the arm 17 of the bracket 15, cannot rotate or twist independently of the said bracket and the lower member secured thereto, and that the up and down movement of the body of the car (not shown) are absorbed by said resilient spheres, excessive movements of the body, of course, flattening the spring 27, which action is accommodated by swinging movement of the links 24.

From the above description, it will be apparent that I have produced a suspension device embodying the features of advantage set forth as desirable in the statement of the object of the invention, and which obviously may be modified in minor particulars without departing from the principle of construction involved or sacrificing any of the advantages of the appended claims.

I claim:

1. A shock absorbing suspension device, comprising a resilient sphere, hemi-spherical housing members inclosing the upper and lower parts of the sphere, and provided with marginal tongues and recesses, the tongues of one member extending into the recesses of the other member, external stops secured to the tongues of the upper member, external stops secured to the tongues of the lower member in a plane slightly above the stops of the upper member, and relatively movable supports for said members.

2. A shock absorbing suspension device, comprising a resilient sphere, hemi-spherical housing members inclosing the upper and lower parts of the said sphere, rings secured externally to said members, the ring of the upper member disposed vertically below the ring of the lower member, and provided with a loop, a rigidly supported bracket secured to and supporting the lower member and provided with an arm engaging the loop of the ring of the upper member, a spring, and pivoted links connecting the end of said spring with the upper member at diametrically opposite points thereof.

In testimony whereof, I hereto affix my signature.

GEORGE S. MATTHEWS.